United States Patent Office 3,267,180
Patented August 16, 1966

3,267,180
RUBBER REINFORCED STYRENE POLYMER CONTAINING A KETONE TO IMPROVE GLOSS
Sally Young Ayres, Midland, and Bernie A. Kozakiewicz, Bay City, Mich., assignors to The Dow Chemical Company, Midland, Mich., a corporation of Delaware
No Drawing. Filed July 3, 1963, Ser. No. 292,772
5 Claims. (Cl. 260—880)

This invention relates to rubber reinforced styrene polymer compositions. It pertains especially to such styrene polymer compositions possessing high gloss when molded and relates to a method of making the same.

It is known to prepare rubber reinforced styrene polymer compositions by dissolving natural or a synthetic rubber in the monomer and thereafter heating the solution to polymerize the monomer, either in mass or in aqueous suspension, or by a combination of such steps, e.g. by partial polymerization in mass followed by a completing of the polymerization in suspension. It is also known to prepare rubber reinforced styrene polymer compositions by mechanically blending a resinous normally solid styrene polymer with a rubber on compounding rolls, a Banbury mixer, or in a plastics extruder, at elevated temperatures, and with or without pressure.

The heretofore known rubber reinforced styrene polymer compositions are useful for a variety of purposes in the home and industry. One method of converting the compositions into shaped articles consists in extruding the compositions are useful for a variety of purposes in the home and industry. One method of converting the compositions into shaped articles consists in extruding the composition as a flat sheet and subsequently molding articles therefrom by vacuum forming, i.e. drawing the heat-softened sheet over or into a mold by vacuum.

In the making of shaped articles from the extruded sheet our researches have shown that the shaped articles possess poor gloss, or that if a polish or high gloss is imparted to the extruded sheet prior to its being drawn or shaped into articles, that during the forming much of the gloss is lost so that the molded articles possess a dull and undesirable finish.

Accordingly, it is a primary object of the invention to provide new compositions of matter consisting essentially of a styrene polymer resin forced with from about 2 to about 20 percent by weight of the composition of natural or a synthetic rubber and a small but effective proportion of a glossing agent as hereinafter defined. Another object is to provide a method for making rubber reinforced styrene polymer compositions suitable for making shaped articles having a high gloss. Still another object is to provide a glossing agent for rubber reinforced styrene polymer compositions. Other and related objects may appear from the following description of the invention.

According to the invention the foregoing and related objects are obtained by incorporating with the rubber reinforced styrene polymer compositions a small but effective proportion within the range of from about 0.01 to 1, preferably from 0.1 to 0.5, percent by weight of a ketone having the general formula $(C_nH_{2n+1})_2CO$ wherein $n$ is a whole number from 8 to 17, e.g. stearone.

The rubber reinforced styrene polymer starting material can be a homopolymer or copolymer of a monovinyl aromatic compound such as styrene, vinyltoluene, vinylxylene, ethylvinylbenzene, isopropylstyrene, tert.-butylstyrene, chlorostyrene, dichlorostyrene, bromostyrene, fluorostyrene or ar-chlorovinyltoluene with from about 2 to 20, preferably from 2 to 15 percent by weight of natural or a synthetic rubber intimately incorporated therewith, or a copolymer of a predominant amount by weight of one or more of such monovinyl aromatic compounds and a minor amount of another monoethylenically unsaturated vinylidene compound copolymerizable therewith such as alpha-methylstyrene, acrylonitrile or methyl methacrylate.

The rubber reinforced styrene polymer compositions and methods of making the same are well known in the art and need not be discussed in detail.

In brief, the polymer compositions can be prepared by dissolving the rubber or rubbery polymer such as natural rubber, rubbery copolymers of styrene and butadiene, rubbery copolymers of acrylonitrile and butadiene, homopolymers of butadiene, or isoprene, and particularly stereospecific butadiene rubber polymers such as polybutadiene consisting of at least 30 percent of cis-1,4 addition polymer and stereospecific copolymers of styrene and butadiene, in the monomer to form a solution of the rubber and monomer and thereafter heating the solution to polymerize the monomer. The polymerization can be carried out in mass, i.e. in the absence or substantial absence of an inert liquid medium, or the solution may be prepolymerized or partially polymerized in mass and thereafter heated in aqueous suspension to complete the polymerization.

In an alternative procedure, the polymer compositions can be prepared by mechanically working or blending a resinous styrene polymer such as polystyrene, a copolymer of 15 to 35 percent by weight of acrylonitrile and from 85 to 65 percent of styrene, or a copolymer of styrene and methyl methacrylate with the desired proportions of rubber at heat-plastifying, elevated temperatures on compounding rolls, a Banbury mixer or in a plastics extruder to intimately incorporate the rubber with the styrene polymer and form a homogeneous composition.

In preparing the compositions of the invention the stearone glossing agent can be incorporated with the rubber reinforced styrene polymer in any usual way such as mechanically blending the stearone with the polymeric ingredients, or by dissolving the stearone in a volatile solvent and contacting it with the polymer and thereafter evaporating the solvent.

In a preferred embodiment the stearone is mixed with a solution of the rubber and monomers, or a partially polymerized solution of the rubber and monomer and the resulting mixture headed, preferably in mass, to complete the polymerization.

The polymer or product is recovered in usual ways, suitably by heating the polymer in vacuum to remove volatile ingredients then separately removing the polymer, cooling and cutting or grinding the polymer to a granular form suitable for molding.

The following examples illustrate ways in which the principle of the invention has been applied, but are not to be construed as limiting its scope.

Example 1

A copolymer of 94 percent by weight of styrene and 6 percent of stereospecific polybutadiene homopolymer having a Mooney number of 35, which copolymer was prepared by polymerizing a solution of the polybutadiene in monomeric styrene, was fed to a plastics extruder wherein it was heated and was intimately blended with 0.1 percent by weight of stearone, fed under pressure and as a liquid to a mid-section of the plastics extruder barrel. The resulting mixture was forwarded in the extruder and was extruded through a slot orifice as a flat sheet which was passed between polished rolls and was provided with a high surface gloss. The sheet was then shaped by being vacuum drawn into a mold to form a flat-bottomed cup-like container. The gloss of the glazed sheet prior to vacuum forming it was measured with a Photovolt glossmeter. The gloss of the interior bottom of the vacuum-formed container was likewise measured. The glazed sheet had a gloss of 89. The interior bottom of the vacuum-formed container made from the glazed sheet had a gloss of 81.

In contrast a similar container vacuum-formed from an extruded and glazed sheet of the copolymer without the stearone had a gloss of only 65.

*Example 2*

A copolymer of 94 percent by weight of styrene and 6 percent of stereospecific polybutadiene having a Mooney number of 55, in the form of molding granules of sizes between 10 and 20 mesh per inch as determined by U.S. Standard screens, and which copolymer was pigmented an opaque white color with about 0.5 percent by weight of titanium oxide, was sprayed with a solution of stearone dissolved in petroleum ether and the petroleum ether solvent evaporated to leave a residue of one percent by weight of stearone coated onto surfaces of the granular copolymer. The resulting copolymer was fed to a plastics extruder wherein the material was heated to the softening point of the copolymer, was thoroughly blended and was extruded as a plurality of strands which were cooled and cut to a granular form. This granular product was injection molded to form test plates of 2 x 3 inches by 0.125 inch thick. The molded test plates were prepared by heating the polymer at 375° F. and injecting it under a pressure of 10,000 pounds per square inch through a nozzle at 375° F. into a mold maintained at a temperature of 150° F. The test pieces thus molded were examined for gloss and the gloss measured with a glossmeter. The test plates had a gloss of 87.2. In contrast, test plates made from the pigmented copolymer, without the stearone had a gloss of only 84.

*Example 3*

A copolymer of 94 percent by weight of styrene and 6 percent of stereospecific polybutadiene rubber having a Mooney number of 55, which copolymer was pigmented black with 0.5 percent by weight of carbon black, in the form of molding granules was coated with 0.5 percent by weight of stearone, molded into test plates and tested for gloss employing procedures similar to those employed in Example 2. The composition had a gloss of 86.2. In contrast the copolymer without the stearone had a gloss of only 85.4.

*Example 4*

In each of a series of experiments, a composition was prepared by adding stearone in amount as hereinafter stated to a solution of 94 percent by weight of styrene and 6 percent of stereospecific polybutadiene having a Mooney number of 55, and thereafter heating the solution in mass, i.e. in the substantial absence of diluents, to polymerize the monomer. The polymer product was recovered by removing volatile ingredients under vacuum. The product was injection molded to form test pieces employing procedure similar to that employed in Example 2. The compositions had the properties:

| Test No. | Stearone, percent | Gloss |
| --- | --- | --- |
| 1 | None | 77 |
| 2 | 0.75 | 82.5 |
| 3 | 0.12 | 80.6 |
| 4 | 0.20 | 82.6 |
| 5 | 0.30 | 81.6 |

Similar results are obtained when a ketone such as pelargone, myristone, or palmitone, having from 17 to 35 carbon atoms in the molecule, is substituted for the stearone used in the examples.

We claim:

1. A composition of matter comprising from about 80 to 98 percent by weight of resinous thermoplastic styrene polymer and from 20 to 2 percent by weight of rubbery butadiene polymer intimately incorporated with one another and in admixture with from about 0.01 to 1 percent by weight based on the weight of the composition of a ketone having the general formula $(C_nH_{2n+1})_2CO$ wherein $n$ is a whole number from 8 to 17.

2. A composition of matter comprising from about 80 to 98 percent by weight of resinous thermoplastic styrene polymer and from 20 to 2 percent by weight of rubbery butadiene polymer intimately incorporated with one another and in admixture with from about 0.01 to 1 percent by weight based on the weight of the composition of stearone.

3. A composition of matter comprising a resinous thermoplastic copolymer of from about 80 to 98 percent by weight of a monovinyl aromatic hydrocarbon and from about 20 to 2 percent of a rubbery butadiene polymer, in admixture with from about 0.01 to 1 percent by weight, based on the weight of the composition, of stearone.

4. A composition of matter comprising a resinous thermoplastic copolymer of from about 80 to 98 percent by weight of styrene and from about 20 to 2 percent of rubbery butadiene homopolymer, in admixture with from about 0.01 to 1 percent by weight, based on the weight of the composition, of stearone.

5. A method of making a rubber reinforced styrene polymer composition suitable for molding into articles having high surface gloss which method comprises admixing from about 0.01 to 1 percent by weight of stearone with a composition comprising from about 80 to 98 percent by weight of a resinous thermoplastic styrene polymer in intimate admixture with from about 20 to 2 percent by weight of a rubbery butadiene polymer.

References Cited by the Examiner

UNITED STATES PATENTS 2,098,537 11/1937 Charch et al. _____ 260—32.8
2,658,048 11/1953 Signer _____ 260—32.8

SAMUEL H. BLECH, *Primary Examiner.*

GEORGE L. LESMES, *Assistant Examiner.*